(12) United States Patent
Lincoln et al.

(10) Patent No.: US 9,881,144 B2
(45) Date of Patent: Jan. 30, 2018

(54) IDENTIFYING USAGE OF CODE

(71) Applicant: International Business Machines Corporation, Armonk, NY (US)

(72) Inventors: Nicholas K. Lincoln, Stockbridge (GB); Josephine D. Messa, Winchester (GB); Simon D. Stone, Sherfield-on-Loddon (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/738,998

(22) Filed: Jun. 15, 2015

(65) Prior Publication Data

US 2016/0364554 A1   Dec. 15, 2016

(51) Int. Cl.
| | |
|---|---|
| *G06F 21/12* | (2013.01) |
| *G06Q 30/04* | (2012.01) |
| *G06F 11/36* | (2006.01) |
| *G06F 9/445* | (2006.01) |
| *G06F 21/10* | (2013.01) |

(52) U.S. Cl.
CPC .............. *G06F 21/121* (2013.01); *G06F 8/60* (2013.01); *G06F 11/3604* (2013.01); *G06F 21/10* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 6,671,818 B1* | 12/2003 | Mikurak | ................ | G06Q 10/06 714/4.21 |
| 6,868,539 B1* | 3/2005 | Travison | ................... | G06F 8/63 717/100 |
| 7,143,409 B2* | 11/2006 | Herrero | ..................... | G06F 8/61 705/51 |
| 7,320,087 B2* | 1/2008 | Sato | ..................... | G06F 11/1433 714/6.1 |
| 7,814,477 B2 | 10/2010 | Sun et al. | | |
| 8,041,642 B2* | 10/2011 | Lenard | .................. | G06F 21/105 705/59 |

(Continued)

OTHER PUBLICATIONS

Erwin, Tony, "Bluemix UI Updates: Say Hello to Watson!", IBM developerWorks / Developer Centers, Oct. 8, 2014, "Grace Period Disclosure", IBM® Watson™, pp. 1-8, <https://developer.ibm.com/bluemix/2014/10/08/bluemix-ui-updates-watson/>.

(Continued)

*Primary Examiner* — Trang Doan
(74) *Attorney, Agent, or Firm* — James H. Mayfield

(57) ABSTRACT

As disclosed herein a method, executed by a computer, includes receiving a deployed computer application to be staged, where the deployed computer application includes monitored items corresponding to a downloaded code package, verifying the integrity of the downloaded code package included in the deployed computer application, and staging the deployed computer application to provide a staged computer application. The method further includes monitoring the staged computer application for usage of monitored items corresponding to the downloaded code package and billing a customer according to usage of the monitored items. A computer system, and a computer program product corresponding to the method are also disclosed herein.

20 Claims, 7 Drawing Sheets

(56) References Cited

U.S. PATENT DOCUMENTS

| | | | | |
|---|---|---|---|---|
| 8,046,755 B2* | 10/2011 | Gaa-Frost | | G06F 8/60 717/168 |
| 8,135,775 B1* | 3/2012 | Anderson | | G06F 8/61 709/203 |
| 8,572,399 B2* | 10/2013 | Rodgers | | G06F 21/572 713/1 |
| 8,607,226 B2* | 12/2013 | Herrero | | G06F 8/65 717/174 |
| 8,635,673 B2 | 1/2014 | Anand et al. | | |
| 8,725,645 B1 | 5/2014 | Montini et al. | | |
| 8,793,359 B1 | 7/2014 | Fiebig et al. | | |
| 8,850,528 B2 | 9/2014 | Van Biljon et al. | | |
| 8,931,038 B2 | 1/2015 | Pulier et al. | | |
| 2003/0225851 A1* | 12/2003 | Fanshier | | H04L 67/34 709/208 |
| 2004/0046033 A1* | 3/2004 | Kolodziej | | G06Q 30/02 235/487 |
| 2005/0188345 A1* | 8/2005 | Chang | | G06F 8/20 717/101 |
| 2006/0041643 A1* | 2/2006 | Fanshier | | G06F 8/61 709/220 |
| 2008/0288350 A1* | 11/2008 | Iris | | G06Q 30/02 705/14.5 |
| 2008/0320358 A1* | 12/2008 | Pandel | | H04L 1/0041 714/752 |
| 2010/0070753 A1* | 3/2010 | Kido | | G06Q 10/06 713/150 |
| 2011/0126168 A1* | 5/2011 | Ilyayev | | G06F 9/5072 717/103 |
| 2011/0191255 A1 | 8/2011 | Sowell | | |
| 2012/0116939 A1 | 5/2012 | Green et al. | | |
| 2012/0254024 A1 | 10/2012 | Bose et al. | | |
| 2013/0152047 A1* | 6/2013 | Moorthi | | G06F 11/368 717/124 |
| 2013/0185413 A1 | 7/2013 | Beaty et al. | | |
| 2014/0126418 A1* | 5/2014 | Brendel | | H04L 12/4641 370/254 |
| 2014/0156519 A1 | 6/2014 | Thompson | | |
| 2014/0164694 A1* | 6/2014 | Storer | | G06F 11/1092 711/114 |
| 2014/0189641 A1* | 7/2014 | Anderson | | G06F 8/60 717/110 |
| 2014/0372963 A1 | 12/2014 | Chandaria et al. | | |
| 2015/0058471 A1 | 2/2015 | McPherson et al. | | |
| 2015/0234730 A1* | 8/2015 | Puthuff | | G06F 11/3636 717/128 |
| 2016/0104067 A1* | 4/2016 | Xu | | H04L 67/306 706/46 |
| 2016/0132805 A1* | 5/2016 | Delacourt | | G06Q 10/06313 705/7.23 |

OTHER PUBLICATIONS

Tomala-Reyes, Angel, "What is IBM Bluemix?", IBM's Open Cloud Architecture implementation based on the Cloud Foundry project, developerWorks®, Jun. 29, 2014, (First published Feb. 24, 2014), © Copyright IBM Corporation 2014, pp. 1-6, <http://www.ibm.com/developerworks/cloud/library/cl-bluemixfoundry/>.

Wikipedia, "Platform as a service", from Wikipedia, the free encyclopedia, this page was last modified on Apr. 7, 2015, at 10:41, pp. 1-6, <http://en.wikipedia.org/wiki/Platform_as_a_service>.

Wikipedia, "Software as a service", from Wikipedia, the free encyclopedia, this page was last modified on Apr. 8, 2015, at 3:53, pp. 1-11, <http://en.wikipedia.org/wiki/Software_as_a_service>.

* cited by examiner

IDENTIFYING USAGE OF CODE

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(1) Tony Erwin, "Bluemix UI Updates: Say Hello to Watson!", 8 Oct. 2014, https://developer.ibm.com/bluemix/2014/10/08/bluemix-ui-updates-watson/

BACKGROUND

The present invention relates to inclusion of a code package in a product, and more particularly to detecting usage of a code package.

The use of computing devices by both individuals and industry as a whole is increasing, and as a result, the demand for easily accessible computing environments and software has also increased. As technology advances, the demand for faster access to the new technologies is also increasing. Many companies use models such as Platform as a Service (Paas) and Software as a Service (SaaS) meet the demands of technology. PaaS is a computer service that provides an on-demand platform (e.g., infrastructure or operating environment) that allows companies to develop, run and manage web applications without the complexity of building and maintaining the infrastructure typically associated with developing and launching an application. SaaS, sometimes referred to as "on-demand software", is a method of licensing and delivering software, where software is accessible over the internet and may be licensed on a per-user or subscription basis.

SUMMARY

As disclosed herein a method, executed by a computer, includes receiving a deployed computer application to be staged, where the deployed computer application includes monitored items corresponding to a downloaded code package, verifying the integrity of the downloaded code package included in the deployed computer application, and staging the deployed computer application to provide a staged computer application. The method further includes monitoring the staged computer application for usage of monitored items corresponding to the downloaded code package and billing a customer according to usage of the monitored items. A computer system, and a computer program product corresponding to the method are also disclosed herein.

DETAILED DESCRIPTION

In today's high-tech society, new technology, in the form of (computer) applications, is constantly available. Individuals and industry embrace new technology through the use of electronic devices such as smart phones, laptop computers, tablet computers, personal computers (PC), and desktop computers. New technology is often available for download through on-demand services such as Platform as a Service (Paas) and Software as a Service (SaaS), hosted by a vendor or service provider and made available to customers over the internet. Current pricing strategies used by PaaS and SaaS services revolve around: (i) pay-per-user: a separate cost is incurred for each user of a SaaS application and is similar to paying for each copy of software on a workstation; and (ii) pay-as-you-go (PAYG): typically charges for the number of users and the amount of resources (e.g., storage, CPU usage, etc.) being consumed during a given time period.

It has been observed that, rather than using PAYG pricing, it may be desirable to provide a more refined pricing strategy based upon consumption (i.e., use) of software executable. More specifically a pricing strategy based upon the instances of use of monitored items within a downloaded code package. The embodiments disclosed herein generally address and solve the above-described problems.

Figure 1:
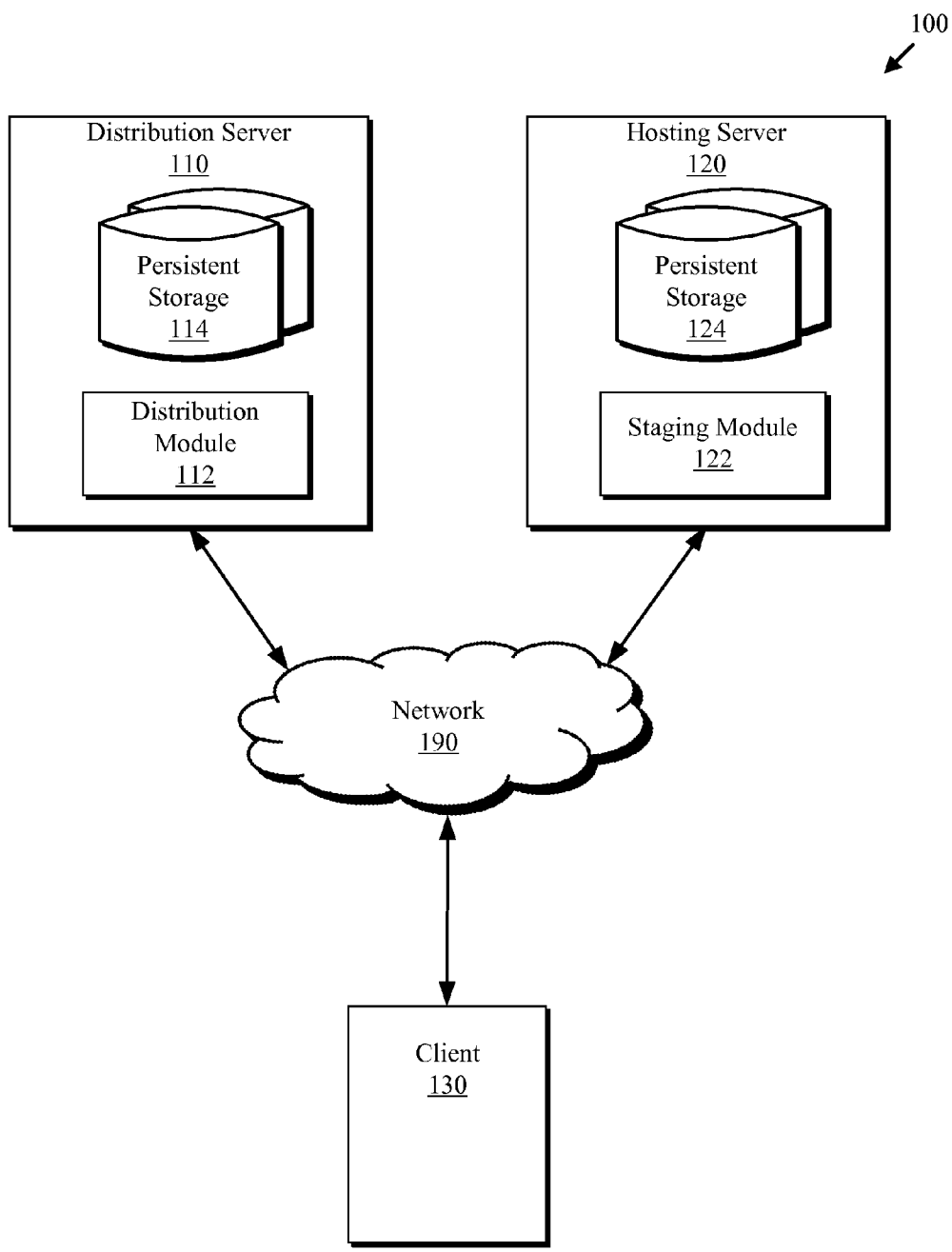
FIG. 1 is a functional block diagram depicting a computing environment in accordance with an embodiment of the present invention.

FIG. 1 is a functional block diagram depicting a computing environment 100 in accordance with an embodiment of the present invention. Computing environment 100 includes a distribution server 110, a hosting server 120, and a client 130 which can be smart phones, tablets, desktop computers, laptop computers, specialized computer servers, or any other computer systems known in the art capable of communicating over network 190. In some embodiments, distribution server 110, hosting server 120, and client 130 represent computer systems utilizing clustered computers and components to act as a single pool of seamless resources when accessed through a network 190. In general, distribution server 110, a hosting server 120, and a client 130 are representative of any electronic devices, or combination of electronic devices, capable of executing machine-readable program instructions, as described in greater detail with regard to FIG. 4.

As depicted, distribution server 110 includes distribution module 112 and persistent storage 114. Distribution server 110 may store the code packages on persistent storage 114. A code package may be a code library, a software development kit (SDK), application programs, and the like. In some embodiments, the code packages are stored as source code. In other embodiments, the code packages are stored as code binaries (e.g., compiled code). Distribution module 112 may be a software application configured to receive requests from other computers (e.g., client 130). Distribution module may also be configured to authorize and download a copy of the requested code package to client 130. Prior to downloading requested code package, distribution module 112 may modify the the copy of the requested code package to include a universally unique identifier (UUID) identifying the user or group (hereinafter referred to as user) that was authorized to use the code package.

Hosting server 120 may provide an environment that enables computer applications and make them accessible via the web, over network 190. As depicted, hosting server 120 includes staging module 122 and persistent storage 124. In some embodiments, the process of client 130 providing the new or updated computer application to hosting server 120 is deployment (i.e., client 130 deploys the new or updated computer application to server 120). After staging module 122 receives a new or updated computer application from client 130, staging module 122 may be configured to stage the application. In some embodiments, staging an application comprises staging module 122 performing any required validation on the deployed application, and promoting (e.g., activating) the deployed application so that it is accessible (e.g., live) over the internet. Both the deployed and staged application may be stored on persistent storage 124.

In the depicted example, distribution server 110 and hosting server 120 are different servers. In other embodiments, distribution server 110 and hosting server 120 are configured on the same physical server. Distribution server 110 and hosting server 120 may be hardware and software provided in a dedicated infrastructure, provided as on-demand virtual machines, or obtained from shared computing resources such as cloud computing resources.

Persistent storage 114 and 124 may be any non-volatile storage media known in the art. For example, persistent storage 114 and 124 can be implemented with a tape library, optical library, one or more independent hard disk drives, or multiple hard disk drives in a redundant array of independent disks (RAID). Similarly, data on persistent storage 114 and 124 may conform to any suitable storage architecture known in the art, such as a file, a relational database, an object-oriented database, and/or one or more tables.

Distribution server 110, hosting server 120, client 130, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between distribution server 110, hosting server 120 and client 130 in accordance with an embodiment of the present invention.

Figure 2:
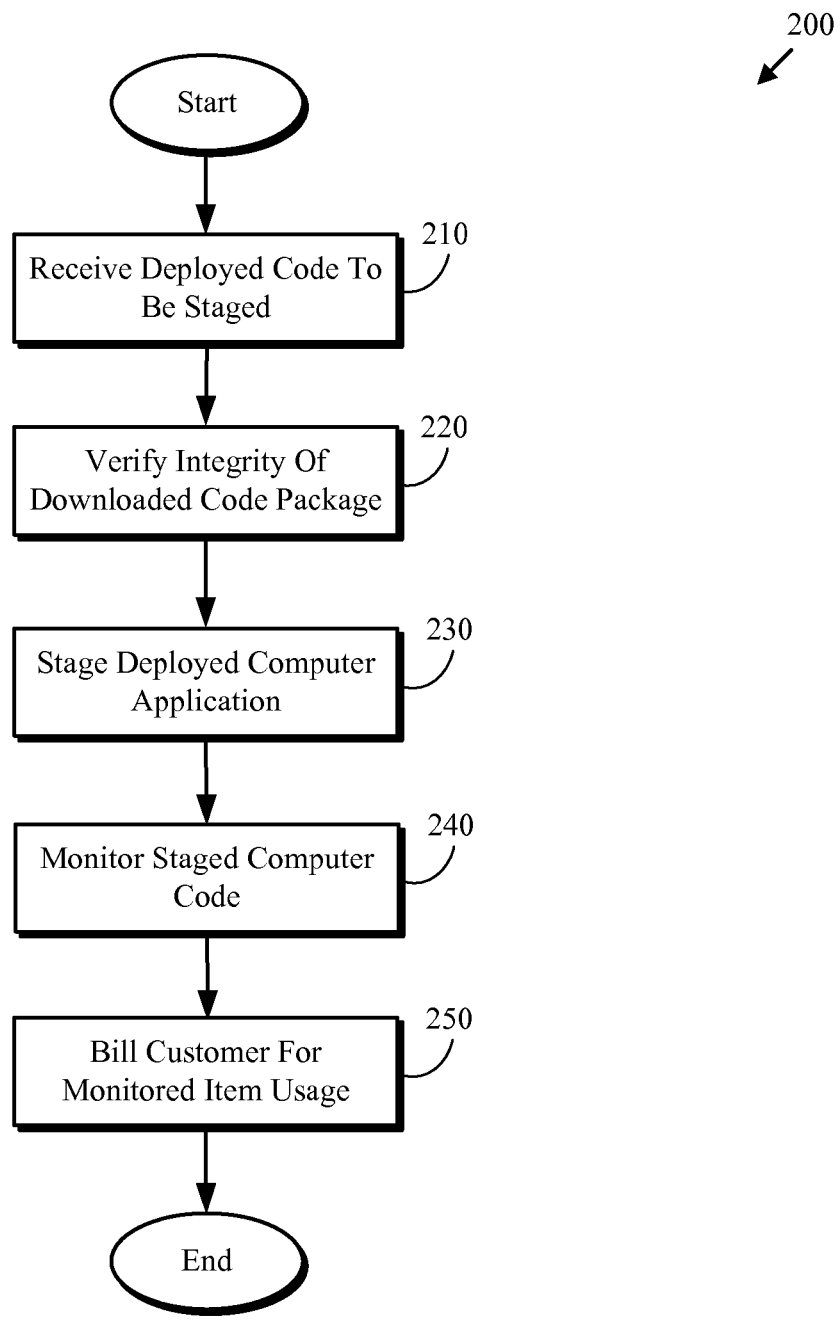
FIG. 2 is a flowchart depicting a staging method, in accordance with an embodiment of the present invention.

FIG. 2 is a flowchart depicting a staging method 200, in accordance with an embodiment of the present invention. As depicted, staging method 200 includes receiving (210) deployed code to be staged, verifying (220) the integrity of a downloaded package, staging (230) a deployed computer application, monitoring (240) staged computer code, and billing (250) a customer for monitored item usage. Staging method 200 enables a staging module (e.g. staging module 122) to validate deployed code prior to completing the staging operation. In addition to validation, staging method 200 enables staging module 122 to monitor and bill customers for using monitored items.

Receiving (210) deployed code to be staged may include staging module 122 receiving a deployed application from a client (e.g., client 130). Client 130 may deploy the application to hosting server 120 as the beginning of the operation of staging the application and promoting the application to become accessible to users over the internet. A deployed application may be a new application, or an updated (e.g., replacement) application. The deployed application may be stored on persistent storage 124 corresponding to hosting server 120.

In some embodiments, the deployed application has incorporated use of a licensed code package (e.g., software development kit, a function library, software package, software component, software library, software module, software plugin, software extension, or the like) that was downloaded from a distribution server (e.g., distribution server 110). In other embodiments, a distribution module (e.g., distribution module 112) modifies the downloaded code package to contain a universally unique identifier (UUID). In another embodiment, distribution module 112 generates a checksum value corresponding to the downloaded package and stores it on persistent storage (e.g., persistent storage 114) for later verification operations. The UUID may identify the user that downloaded the code package (i.e., the authorized user of the package). The checksum may be used to determine if the downloaded code package has been altered.

Verifying (220) the integrity of a downloaded package may include staging module 122 detecting that the deployed application includes a downloaded (e.g., licensed) code package. Verification may include confirming the user that deployed the application is authorized to use the downloaded code package, and confirming that the downloaded code package has not been altered. The verifying operation will be described in greater detail with regard to FIG. 3.

Staging (230) a deployed computer application may include staging module 122 enabling the deployed computer application to be accessible to a user community (i.e., the application becomes live). Hosting environments may be unique, and therefore the staging operation may be a general process that has to be customized according to specific requirements or characteristics of the environment. In some embodiments, the application is a web application hosted on a webserver, and staging module 122 copies the deployed application to a location on persistent storage (e.g., persistent storage 124) that is accessible by the web server. Additionally, the web server may be configured to enable or activate the web application (i.e., the application becomes live).

Monitoring (240) staged computer code may include staging module 122 monitoring each instance of staged application to detect when monitored items are executed. A monitored item may be a function, method, service or the like that has a license fee associated with it. Staging module 122 may use monitoring techniques familiar to those of skill in the art. In some embodiments, staging module 122 uses message filtering techniques such as publish-subscribe or event notifications methods, (e.g., the host server retaining details of a monitored item call and the UUID of the caller on a database). In other embodiments, staging module 122 uses scraping/mining techniques to search host server 120 for monitored item usage. In another embodiment, staging module 122 maintains a log identifying each time a monitored item was executed. The log may contain: (i) the fully qualified name of the monitored item being used; (ii) the name of the application calling the monitored item, and (iii) the domain where the application is running. In other embodiments, staging module 122 maintains a list of accessed monitored items and the total number of times each monitored item was executed. In another embodiment, he monitored application contains more than one downloaded code package, and staging module 122 maintains usage statistics corresponding to each unique downloaded code package.

Billing (250) a customer for monitored item usage may include staging module 122 accumulating the statistics gathered during monitoring operation 240. In some embodiments, staging module 122 calculates a total charge for a customer using flat rate per use fee schedule and charging for each time the staged application executed a monitored item. In other embodiments, staging module 122 calculates a total charge for a customer using graduated fee schedule which enables charging different rates depending on the number of times the staged application executes a monitored item. In one embodiment, on the last Friday of each month, staging module 122 calculates total charges per customer on a monthly basis and notifies each customer of their monthly fees. In another embodiment, staging module 122 maintains a running balance of total charges, and at predefined times (e.g., weekly, monthly, or quarterly) bills are bills are generated and sent to each customer. In some embodiments, a third party billing application performs the billing operation.

Figure 3:
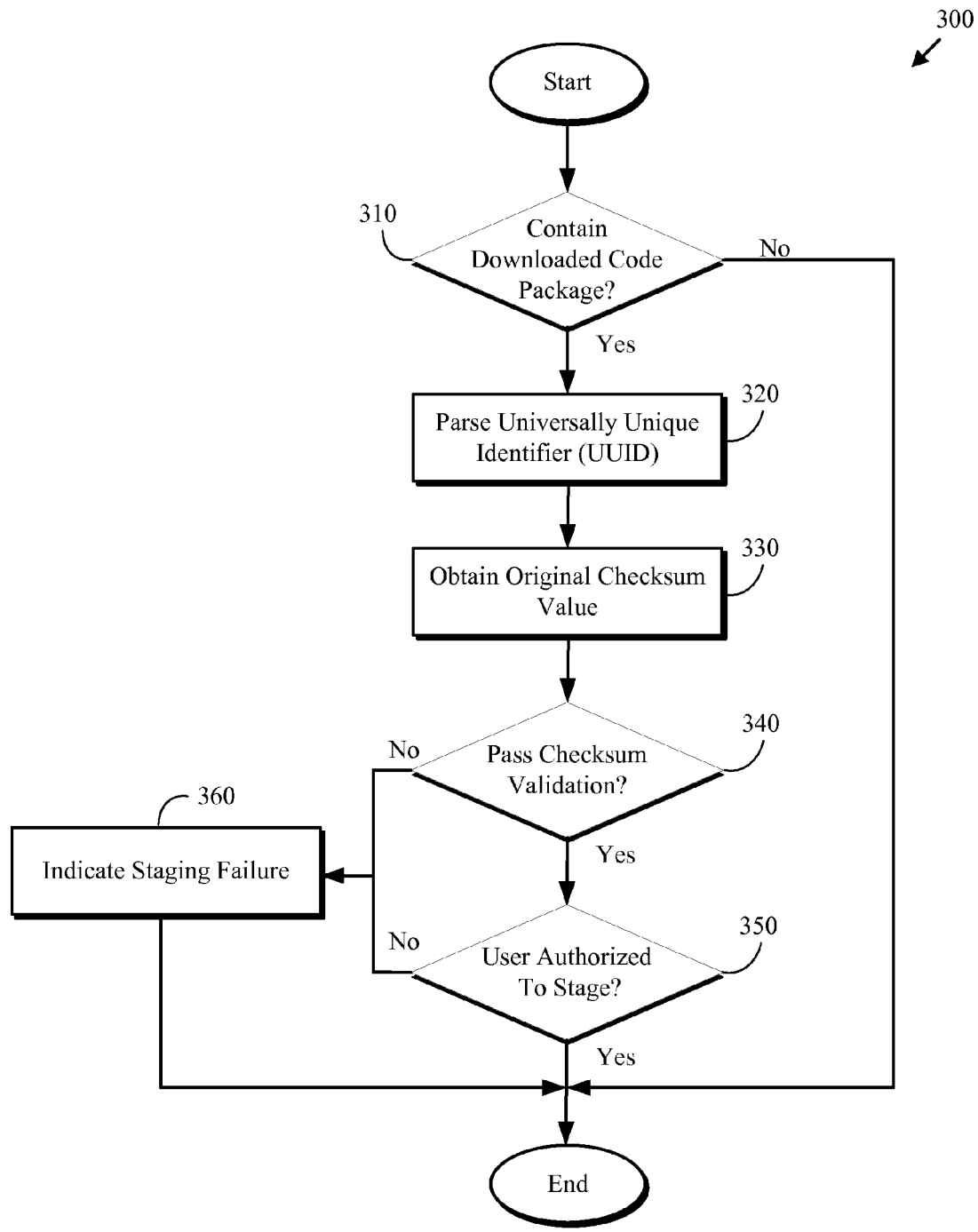
FIG. 3 is a flowchart depicting a verification method, in accordance with an embodiment of the present invention.

FIG. 3 is a flowchart depicting a verification method 300, in accordance with an embodiment of the present invention. As depicted, verification method 300 includes determining (310) whether a deployed application includes a downloaded code package, parsing (320) a universally unique identifier (UUID), obtaining (330) an original checksum value, determining (340) whether a checksum validation passed, determining (350) whether a user is authorized to stage the application, and indicating (360) a staging operation failure. Verification method 300 enables staging module 122 to validate the integrity of an application containing a downloaded code packaged prior to completing the staging operation and activating a deployed application.

Determining (310) whether a deployed application includes a downloaded code package may include staging module 122 searching the deployed application for included code packages that require licensing fees. If the deployed application does include a downloaded code package, then verification method 300 proceeds to obtaining (320) an original checksum value. Otherwise, no additional validation is required and the method exits.

Parsing (320) a universally unique identifier (UUID) may include staging module 122 searching the deployed application for keys that match a generated UUID pattern. In some embodiments, a UUID includes the identity (e.g., a userid) of the user that downloaded the included code package (i.e., the user authorized to use the copy of the code package included in the deployed code). In other embodiments, the UUID includes the identity of the originating distribution server (e.g., distribution server 110) form which the code package was downloaded.

Obtaining (330) an original checksum value may include staging module 122 requesting, from the originating distribution server (e.g., distribution server 110), the checksum corresponding to the downloaded package that is included in the deployed application. In some embodiments, the UUID is provided to the distribution server 110, and the UUID maps to a storage location (e.g., on persistent storage 114) corresponding to the original checksum value of the code package associated with the UUID.

Determining (340) whether a checksum validation passed may include staging module 122 generating a checksum for the downloaded code package. If there is a mismatch between the generated checksum value and the original checksum value, the downloaded code package has been altered (e.g., may contain malicious changes). If the generated checksum value matches the original checksum, then verification method 300 proceeds to determining (350) whether a user is authorized. Otherwise, the method proceed to indicating (360) a staging operation failure.

Determining (350) whether a user is authorized to stage the application may include staging module 122 comparing the userid obtained from the UUID with the userid that deployed the code. The user identified in the UUID is the user authorized to use the downloaded code package, and therefore is the one authorized to deploy code containing the downloaded code package. If the user is authorized to stage the application, then the verification operation has completed successfully and verification method 300 exits. Otherwise, the method proceed to indicating (360) a staging operation failure.

Indicating (360) a staging operation failure may include staging module 122 aborting the staging operation. Additionally a failure notification identifying the reason for the staging operation failure will be provided to the user that deployed the application. In some embodiments, the failure notification is a real time message displayed on the computing device being used by the user. In other embodiments, the failure notification is sent as an email to the userid that deployed the application.

Figure 4:
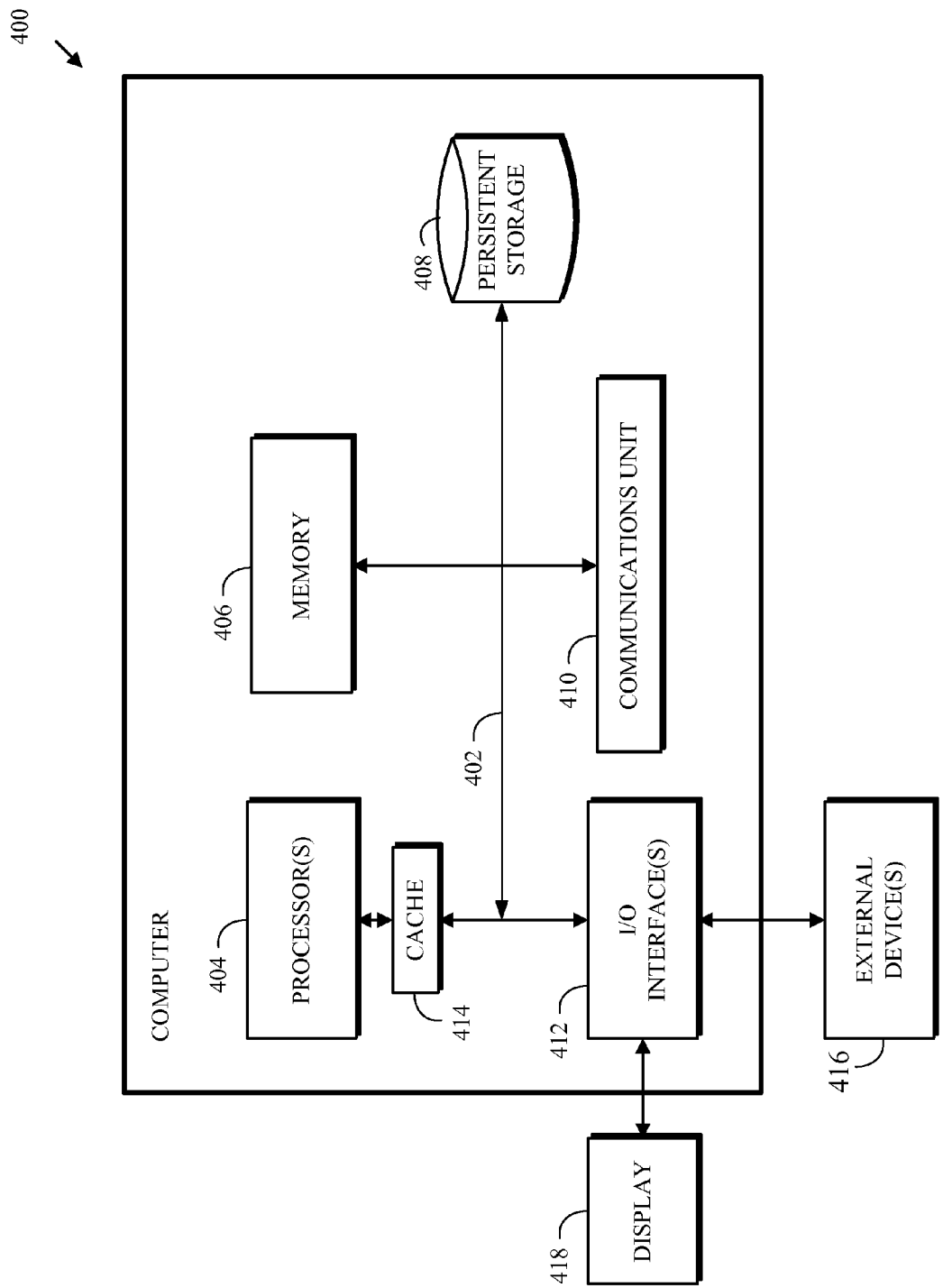
FIG. 4 is a block diagram depicting various components of one embodiment of a computer suitable for executing the methods disclosed herein.

FIG. 4 is a block diagram of components of a computer system 400, which depicts an example of a computer system that may be used within computing environment 100 of FIG. 1. For example, the computer system 400 may be used as distribution server 110, hosting server 120, and client 130. It should be appreciated that FIG. 4 provides only an illustration of one implementation and does not imply any limitations with regard to the environments in which different embodiments can be implemented. Many modifications to the depicted environment can be made.

Distribution server 110, hosting server 120, and client 130 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., staging method 200 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distribution server 110, hosting server 120, and client 130. In these examples, communications unit 410 includes one or more network interface cards. Communications unit 410 may provide communications through the use of either or both physical and wireless communications links. Program instructions and data used to practice embodiments of staging method 200 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
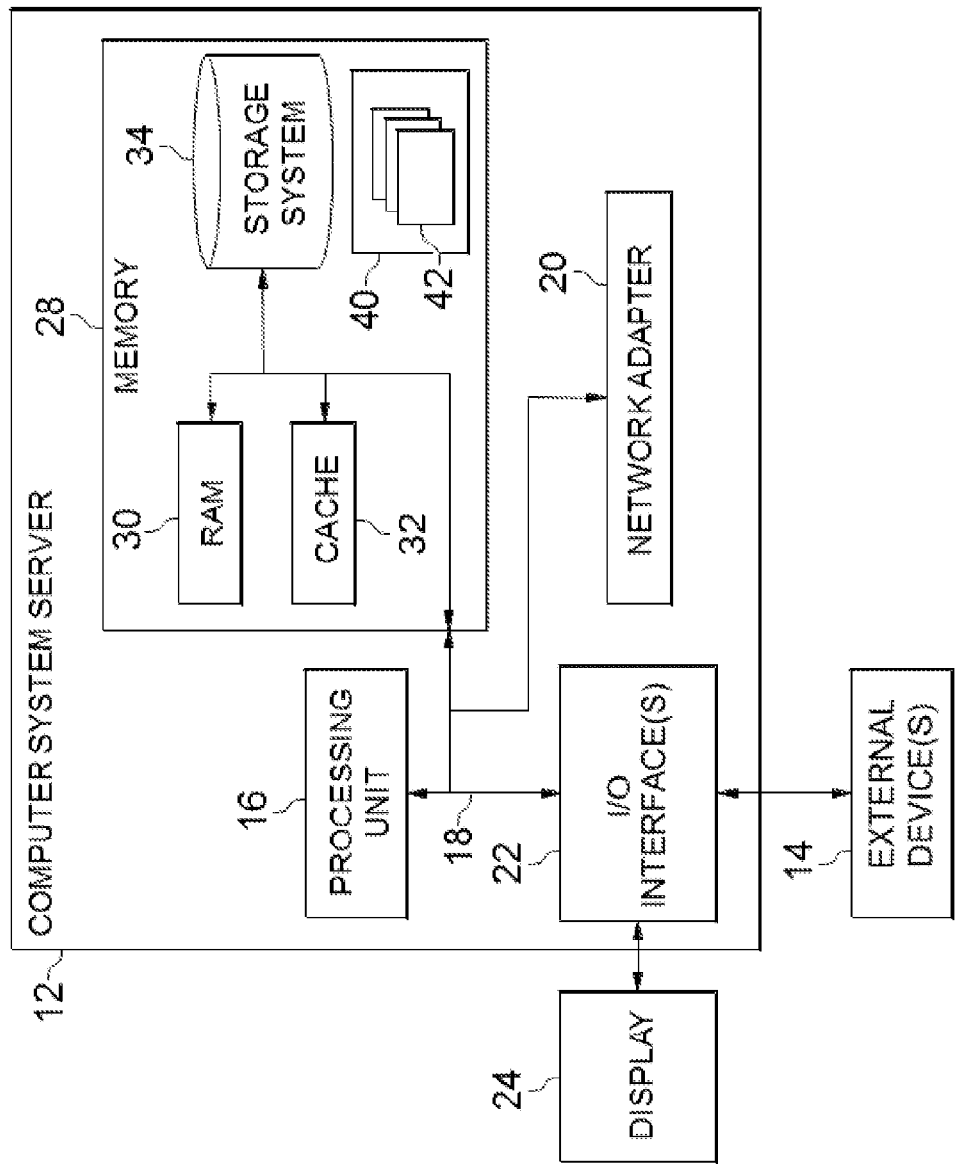
FIG. 5 is a block diagram depicting a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
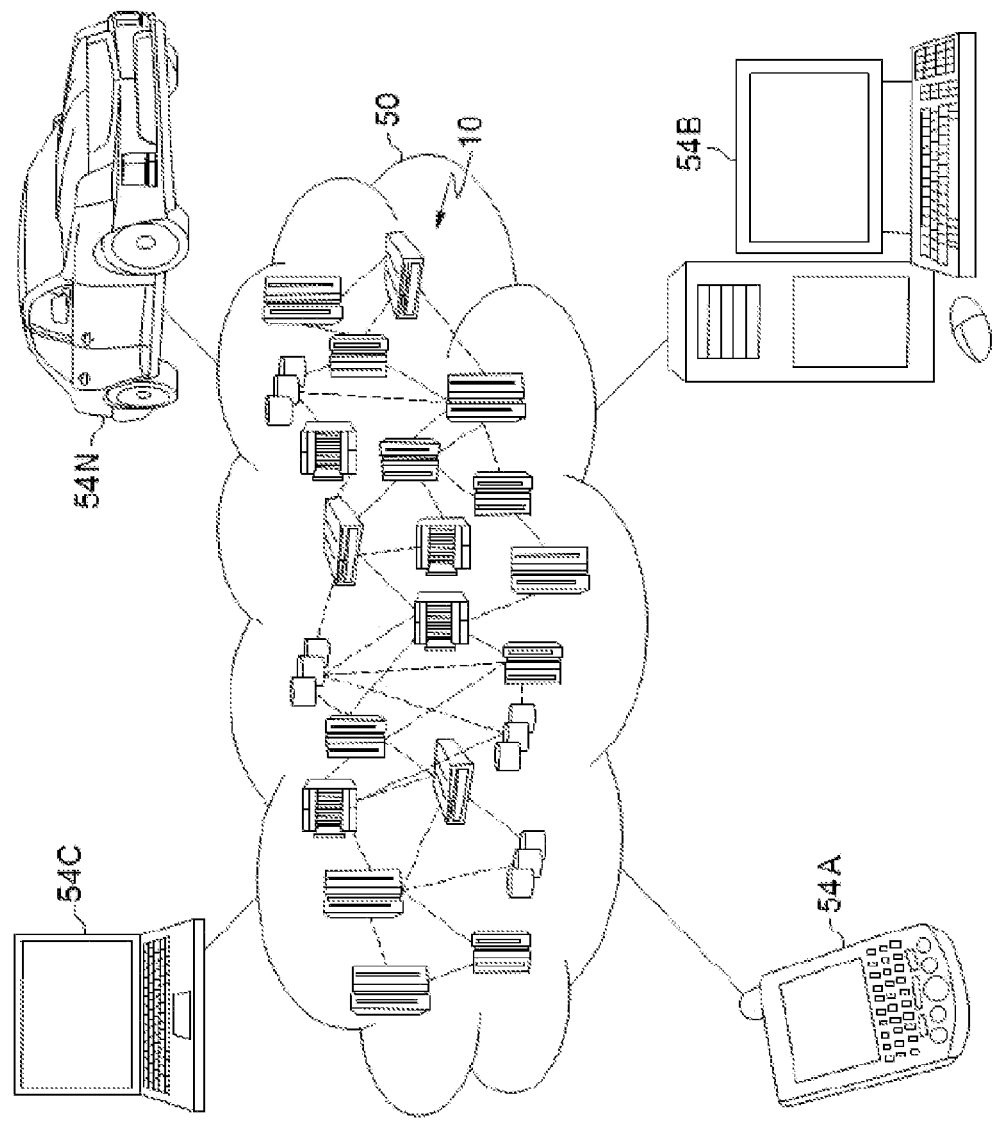
FIG. 6 is a schematic diagram depicting a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
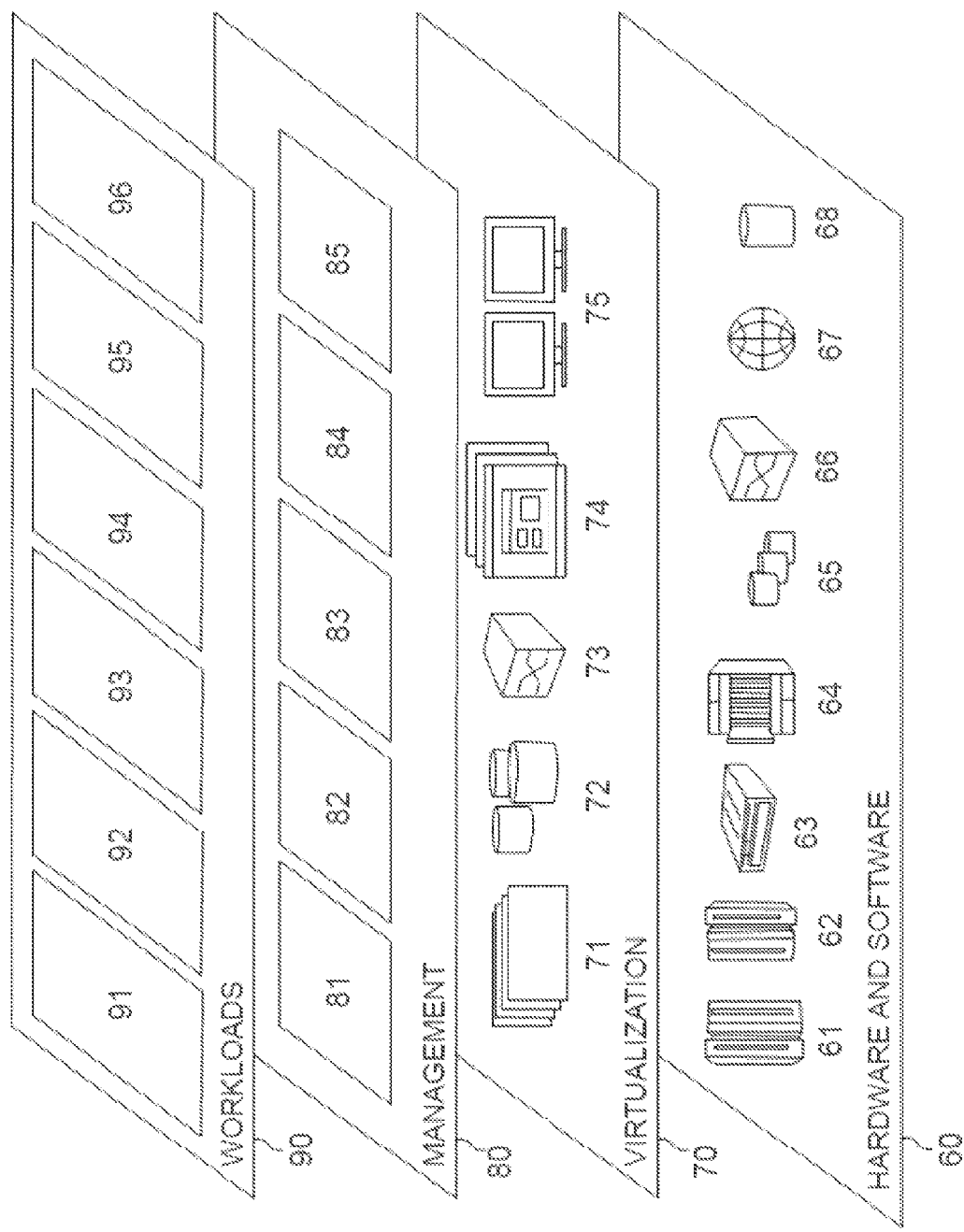
FIG. 7 is a schematic diagram depicting abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
    receiving a deployed computer application to be staged, wherein the deployed computer application comprises a downloaded code package;
    detecting that the downloaded code package contains one or more items subject to a license agreement;
    verifying the integrity of the downloaded code package included in the deployed computer application;
    staging the deployed computer application to provide a staged computer application;
    monitoring the staged computer application for one or more execution events of the one or more items subject to a license agreement corresponding to the downloaded code package, wherein monitoring is limited to the one or more items subject to a license agreement; and
    billing a customer according to the one or more execution events of the one or more items subject to a license agreement.

2. The method of claim 1, wherein the downloaded code package comprises a universally unique identifier (UUID) that identifies a user or a group that is authorized to use the downloaded code package.

3. The method of claim 2, further comprising, using the UUID to determine if the user or the group that provided the deployed computer application is authorized to use the downloaded code package.

4. The method of claim 2, wherein a staging operation fails if the user or the group that deployed the deployed computer application is not authorized to use the downloaded code package.

5. The method of claim 1, further comprising generating a checksum to verify the integrity of the downloaded code package.

6. The method of claim 5, wherein a checksum mismatch causes a staging operation failure.

7. The method of claim 6, further comprising, providing a staging failure notification, responsive to the staging operation failure.

8. A computer program product comprising:
    one or more computer readable storage media and program instructions stored on the one or more computer readable storage media, the program instructions comprising instructions to:
    receive a deployed computer application to be staged, wherein the deployed computer application comprises a downloaded code package;
    detect that the downloaded code package contains one or more items subject to a license agreement;
    verify the integrity of the downloaded code package included in the deployed computer application;
    stage the deployed computer application to provide a staged computer application;
    monitor the staged computer application for one or more execution events of the one or more items subject to a license agreement corresponding to the downloaded code package, wherein monitoring is limited to the one or more items subject to a license agreement; and
    bill a customer according to the one or more execution events of the one or more items subject to a license agreement.

9. The computer program product of claim 8, wherein the downloaded code package comprises a universally unique identifier (UUID) that identifies a user or a group that is authorized to use the downloaded code package.

10. The computer program product of claim 9, wherein the program instructions include instructions to determine if the user or the group that provided the deployed computer application is authorized to use the downloaded code package.

11. The computer program product of claim 9, wherein a staging operation fails if the user or the group that deployed the deployed computer application does is not authorized to use the downloaded code package.

12. The computer program product of claim 8, wherein the program instructions include instructions to generate a checksum to verify the integrity of the downloaded code package.

13. The computer program product of claim 12, wherein a checksum mismatch causes a staging operation failure.

14. The computer program product of claim 13, wherein the program instructions include instructions to provide a staging failure notification, responsive to the staging operation failure.

15. A computer system comprising:
one or more computer processors;
one or more computer readable storage media;
program instructions stored on the computer readable storage media for execution by at least one of the computer processors, the program instructions comprising instructions to:
receive a deployed computer application to be staged, wherein the deployed computer application comprises a downloaded code package;
detect that the downloaded code package contains one or more items subject to a license agreement;
verify the integrity of the downloaded code package included in the deployed computer application;
stage the deployed computer application to provide a staged computer application;
monitor the staged computer application for one or more execution events of the one or more items subject to a license agreement corresponding to the downloaded code package, wherein monitoring is limited to the one or more items subject to a license agreement; and
bill a customer according to the one or more execution events of the one or more items subject to a license agreement.

16. The computer system of claim 15, wherein the downloaded code package comprises a universally unique identifier (UUID) that identifies a user or a group that is authorized to use the downloaded code package.

17. The computer system of claim 16, wherein the program instructions include instructions to determine if the user or the group that provided the deployed computer application is authorized to use the downloaded code package.

18. The computer system of claim 16, wherein a staging operation fails if the user or the group that deployed the deployed computer application is not authorized to use the downloaded code package.

19. The computer system of claim 15, wherein the program instructions include instructions to generate a checksum to verify the integrity of the downloaded code package.

20. The computer system of claim 19, a checksum mismatch causes a staging operation failure.

* * * * *